Aug. 27, 1957 F. J. PRUCHA ET AL 2,803,978
MECHANISM FOR REMOVING A CASTING FROM A MOLD
Filed May 10, 1955 2 Sheets-Sheet 1
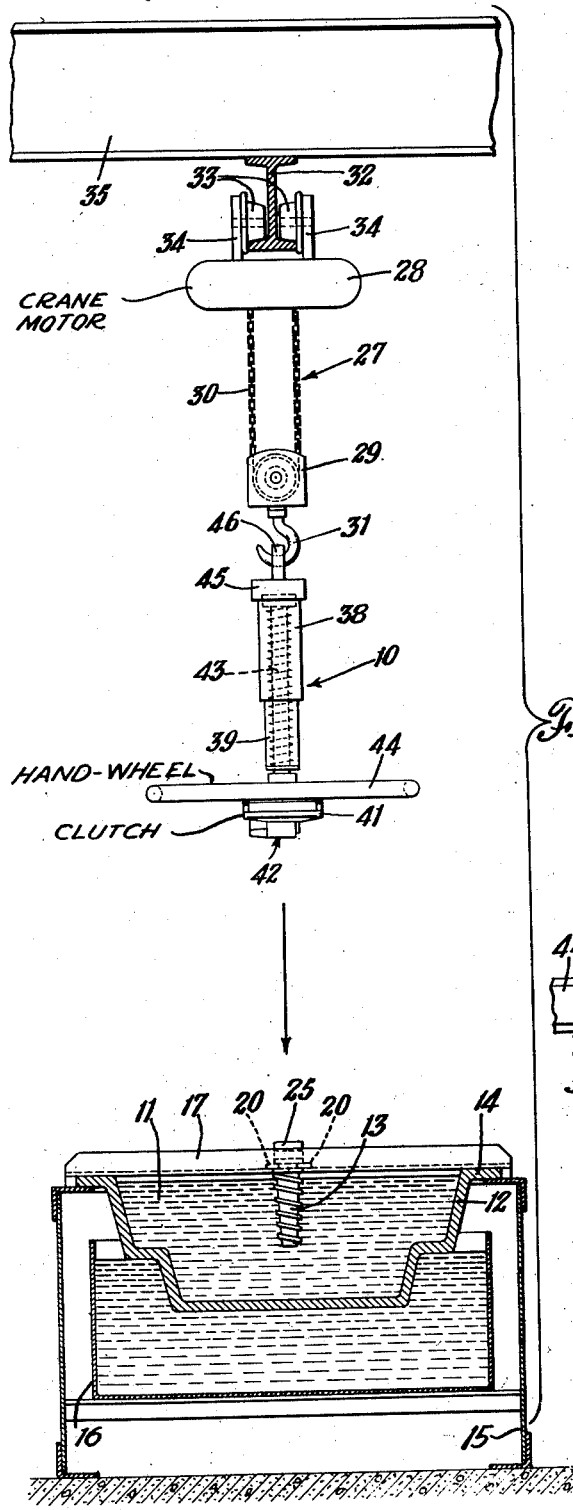
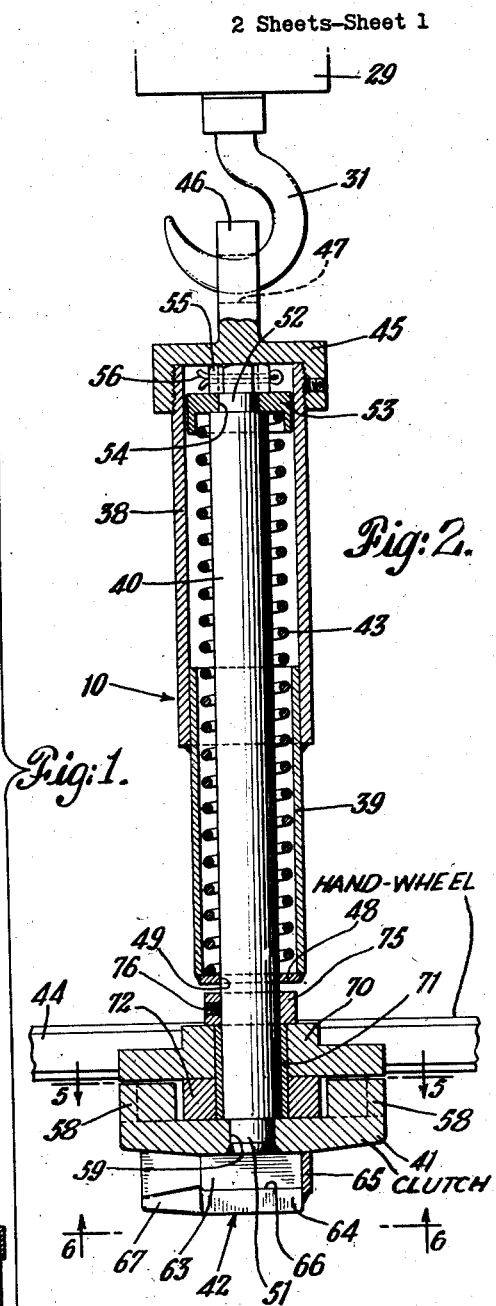
INVENTORS
FRANK J. PRUCHA
ERNEST G. ABERSFELLER
BY Elwood J Schaffer
ATTORNEY

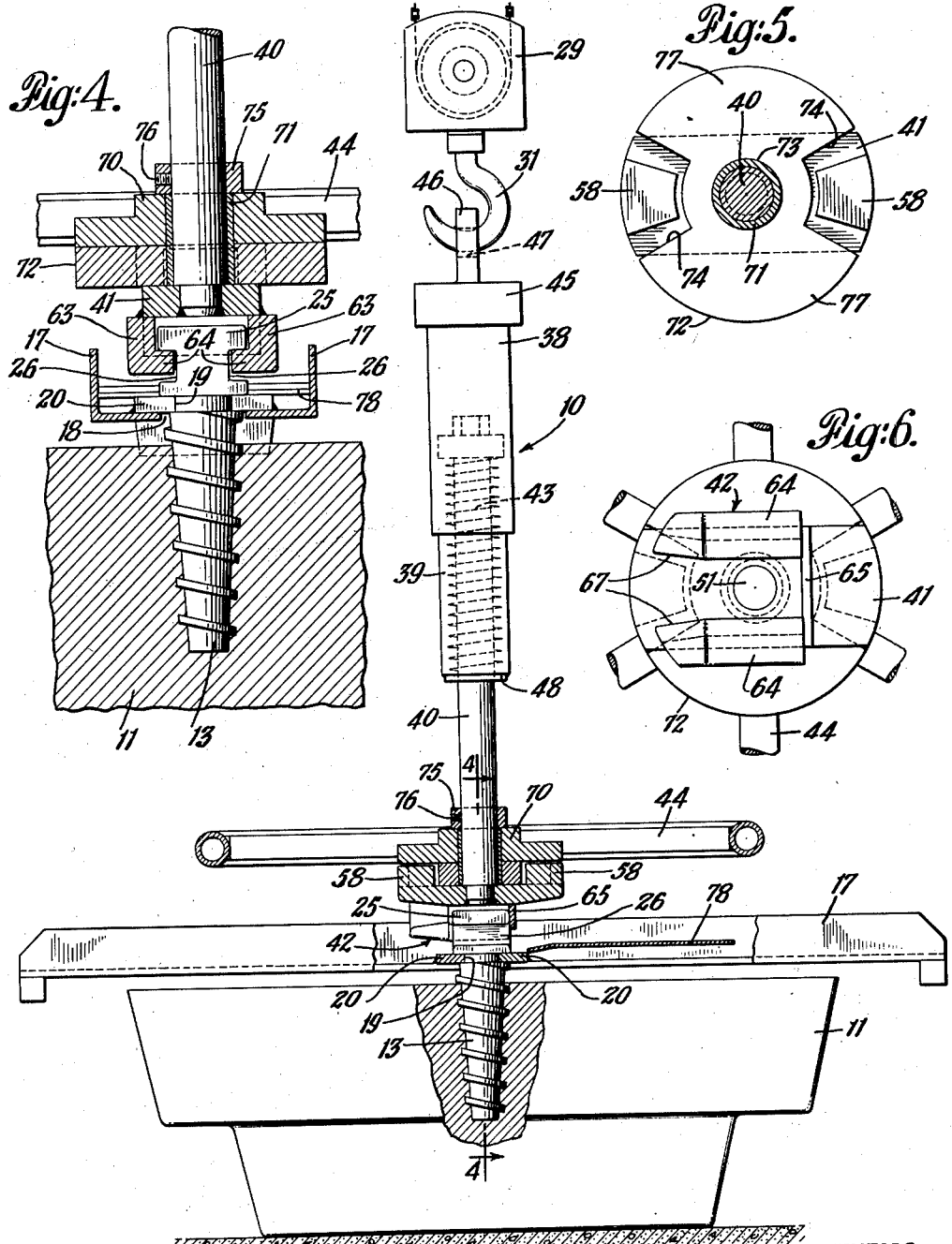

United States Patent Office 2,803,978
Patented Aug. 27, 1957

2,803,978

MECHANISM FOR REMOVING A CASTING FROM A MOLD

Frank J. Prucha and Ernest G. Abersfeller, Omaha, Nebr., assignors to American Smelting and Refining Company, New York, N. Y., a corporation of New Jersey Application May 10, 1955, Serial No. 507,203

2 Claims. (Cl. 81—52.3)

This invention relates to mechanism for removing a casting from a mold. More particularly, it relates to mechanism for lifting a lead ingot from a mold by means of a screw embedded in the ingot and also for extracting the screw from the ingot after the latter has been removed from the mold.

The general object of the invention is to provide mechanism for removing an ingot which has been cast in a mold, which mechanism is simple and inexpensive in construction and efficient in operation.

Another object is to provide mechanism for lifting an ingot from a mold by means of a screw about which the ingot has been cast. A further object is to provide such mechanism with means for extracting said screw from the ingot. Another object is to provide for lifting the screw extracting means as well as the screw as the latter is being extracted from the ingot. Other objects and advantages will become apparent from the following more detailed description.

The invention is further illustrated in the accompanying drawings which illustrate the preferred form thereof. It should be understood, however, that the drawings are given for purposes of illustration and that the invention in its broader aspects is not limited thereto.

In the drawings:

Fig. 1 is a general assembly view of the mechanism for the removal of an ingot from a mold, showing the mechanism in the retracted position.

Fig. 2 is an enlarged vertical section of the lifting mechanism showing the hoist in the retracted position of Fig. 1.

Fig. 3 is a view showing the hoist in position for removal of the screw embedded in the ingot.

Fig. 4 is a view taken along the line 4—4 of Fig. 3 in the direction of the arrows.

Fig. 5 is a view taken along the line 5—5 of Fig. 2 in the direction of the arrows.

Fig. 6 is a view taken along the line 6—6 of Fig. 2 in the direction of the arrows.

Referring now to Figs. 1 and 3, there is shown a hoist indicated generally by the numeral 10 for lifting an ingot 11 from mold 12 by means of screw 13 which is embedded in the ingot. The mold may be water cooled and may be provided with flanges 14 which are adapted to rest upon frame 15 with the bottom and, if desired, at least part of the mold's sides immersed in water contained in tank 16.

The screw may be rotatably mounted on a support 17 which may rest on the top of the mold to hold the screw in position in the mold while lead or other material to be cast is poured into the mold. Thus, the screw may be disposed in opening 18 in the support 17 and rotatably held therein by means of plates 20 which are disposed in the annular groove 19 in the screw; the plates 20 being suitably attached to the support 17, as by welding, after the plates have been placed in the annular groove. The screw is also provided with a coupling member 25 adapted to receive an element of the hoist for lifting and turning the screw. Thus, coupling member 25 may be provided with a pair of spaced transverse grooves 26 for receiving a fork, as will be described hereinafter in greater detail.

The hoist 10 may include a suitable conventional crane 27 for raising and lowing the hoist and moving it toward and away from a position over the mold 12. The crane may be provided with an appropriate motor mounted in housing 28 for raising or lowering the block 29 mounted on chain 30; the block being provided with hook 31. The crane may also be movably mounted on monorail 32 by means of wheels 33 which are suitably rotatably mounted on brackets 34 attached to the motor casing 28. The monorail may be fastened to a suitable overhead support indicated generally by the beam 35.

Details of the hoist are shown in Figs. 2 through 6. As seen in these figures, it comprises an upper support which may be fabricated of tubular pipes 38 and 39, a lower support which may be fabricated of shaft 40 having clutch 41 and fork 42 attached thereto, spring 43 and hand-wheel 44. Pipes 38 and 39 may be suitably joined together, as by welding, with their ends overlapping, as shown. Cap 45 may be threaded on the top of pipe 38 and may be provided with bracket 46 attached to the cap; the bracket having an eye 47 for receiving crane hook 31. Plate 48, having opening 49 for slidably accommodating shaft 40, may be attached to the bottom of pipe 39.

The shaft 40 is retractably mounted in the pipes 38 and 39 of the upper support with the lower part of the shaft projecting through plate 48. The shaft may be provided with lower shank 51 and threaded upper shank 52. Spring receiving cap 53 having an opening 54 adapted to receive shank 52 is inserted on the latter and held in place by nut 55 which is locked on the shaft by cotter pin 56. Coil spring 43 is disposed in pipes 38 and 39 and is mounted on shaft 40 with the upper and lower ends of the spring bearing against cap 53 and plate 48 respectively. The spring 43 is of a size and length sufficient to retract upwardly shaft 40, clutch 41, fork 42, hand-wheel 44, together with screw 13 and support 17. Preferably, the spring is strong enough to retain the rod 40 substantially in the retracted position shown in Fig. 2 when the rod is bearing the weight of screw 13 and support 17.

The clutch 41 is attached to shaft 40. It may be a bar provided with impact abutments, such as the pair of jaws 58, and may be attached to shaft 40 by inserting the shank 51 into the centrally located opening 59 in the bar and then welding the latter to the shank. The lower face of the bar may slope upwardly, as shown, and the jaws 58 may be formed integrally with the clutch or suitably attached thereto, as by welding. The jaws are adapted to receive impact from corresponding means in register therewith on the hand-wheel 44 and to deliver the torque developed thereby to a screw held by the fork 42 in a manner to be described more fully hereinafter.

The tines of the fork 42 may be L shaped in vertical section with their vertical legs 63 of a length sufficient to accommodate loosely the portion of the coupling member 25 of the screw 13 which is above the grooves 26, in the space between the bottom of the clutch 41 and the top of the horizontal legs 64 of the tines. The tines may also be attached to back plate 65 and the top of these elements may be attached, as by welding, to the bottom of the clutch 41 with the horizontal legs 64 of the tines parallel to the bar-shaped clutch 41 and spaced laterally so as to be received by and be disposed in the transverse grooves 26 in the coupling member when the latter abuts the back plate 65, as shown in Figs. 3 and 4. In addition, the top inner portion 66 of the horizontal legs of the tines may be recessed, as shown in Fig. 2, to receive the coupling member. Also, the inner sides 67 of the end portion of the tines may diverge outwardly, as shown in Fig. 6, and the corresponding top portion of the tines may be sloped downwardly, as shown in Fig. 2. Such end construction of the tines together with the upward slope of the bottom of clutch 41 serve to facilitate the guiding of the coupling member 25 into the fork.

The hand-wheel 44 may be provided with hub 70, sleeves 71 and plate 72; the latter being provided with a central opening 73 in which the sleeve 71 is received. The plate 72 may be suitably attached, for example by welding, to the hub 70 and is provided with cut-out portions 74 which are adapted to receive loosely the abutments 58 on clutch 41. The hand-wheel and plate 72 attached thereto are rotatably mounted on rod 40 by means of sleeve 71, with the abutments 58 loosely disposed in the cut-out portions 74, as shown in Fig. 5. The hand-wheel is held in this position on the rod 40 by ring 75 which, in turn, is held in place by locking screw 76. With this construction, the solid portions 77 of the plate 72 serve as impact abutments or jaws for delivering blows to the abutments 58 on clutch 41. Thus, the hand-wheel may be turned so as to multiply the torque applied to a screw held in fork 42.

In operation, the support 17 in which screw 13 is rotatably mounted, is placed on top of an empty mold 12 with the screw vertically disposed with the body thereof in the mold cavity. Preferably, the screw is rotated in the support 17, as required, until the transverse grooves 26 in the coupling 25 which form the screw head are parallel to the longitudinal axis of the support when the latter is in position resting upon the top of the mold. The mold is then filled with molten metal and the latter is allowed to freeze with the screw embedded in the metal, as shown in Fig. 1. When the metal in the mold is solidified, the hoist 10 is moved on monorail 32 until it is over the mold, as shown in Fig. 1, with the rod 40 in the completely retracted position shown in Fig. 2. Thereafter, the hoist 10 is lowered on chain 30 until the tines of fork 42 are on a level or somewhat below the level of the transverse grooves 26. The fork 42 is then slipped on to the coupling 25 until these two elements are in the engaged position illustrated in Figs. 3 and 4, with the tines of the fork disposed in the grooves 26 of the coupling member and with the latter resting in the recessed portion 66 of the tines of the fork. In coupling the member 25 to the fork, the shape of the ends of the tines of the fork and the upward slope of the bottom surface of clutch 41 also facilitate the guiding of the fork into engagement with the coupling member. In this connection, the support 17 also may be provided with horizontal guide 78 to assist in guiding the fork into engagement with the coupling member. The guide 78 may be suitably attached to the support 17 on a level with the lower edge of the grooves 26.

With the fork thus engaging the coupling member of the screw, the hoist is raised by the crane 27 until the ingot, which has been cast about the screw, is lifted clear of the mold. In its upward motion, the crane gradually assumes the full weight of the ingot and in so doing the rod 40 moves downwardly through the opening 49 in the plate 48 to compress the spring 43 so that when the crane bears the full weight of the ingot, the spring may be completely compressed.

After the ingot is lifted clear of the mold, the hoist is moved on the monorail to a desired unloading position. At the unloading position, the hoist is lowered on chain 30 until the ingot rests on the floor with the spring 43 still under compression, as shown in Fig. 3. The hand-wheel 44 is then rotated on rod 40 sufficiently vigorously, using a reciprocating motion, if required, to apply sufficient torque to the screw 13 so as to loosen the latter in the casting. Such torque is readily and easily applied due to the torque multiplying effect obtained by the impact of jaws 77 of the hand-wheel upon the jaws 58 of the clutch 41.

After the screw has been loosened, the hand-wheel is turned until the screw is free of the casting. As the screw moves out of the casting, shaft 40, clutch 41, fork 42 and hand-wheel 44 together with screw 13 and support 17, are retracted upwardly by spring 43 as the latter is still under compression. This is another important and advantageous feature of the invention in that the operator is relieved of the necessity of operating the crane while the screw is being removed from the casting.

In general, however, it is most convenient to use a single screw centrally located with respect to the top surface of the ingot. Centrally located screws, particularly a single centrally located screw, have been found to have a further advantage in that they appear to reduce holes and bubbles and similar defects in the ingot, which are caused by gas which is released in the metal during freezing.

We claim:

1. In a hoist having an upper support, a lower support, one of said supports being mounted in the other support in telescopically movable relationship therewith, means associated with said supports for urging the supports into a retracted position with respect to each other, and a coupling member secured to said lower support, the improvement comprising a hand wheel rotatably mounted on said lower support, an impact delivering abutment connected to said hand wheel, and an abutment connected to said lower support for receiving impact from said impact delivering abutment, whereby the hand wheel may be turned to apply multiplied torque to said coupling member, and said supports when in an extended position with respect to each other are retracted by said urging means as the supports are free to retract.

2. In a mechanism for removing a casting from a mold by a screw embedded in the casting, a hoist comprising an upper tubular support, a lower support mounted in said upper support in telescopically movable relationship therewith, a spring mounted on said supports for urging said lower support upwardly into a retracted position in the upper support, the lower end of said lower support when in said retracted position projecting beyond the bottom of said upper support, a fork-type coupling member secured to the lower end of the lower support for engaging a screw to hold and turn the latter, a hand wheel rotatably mounted on said lower support below the upper support, impact delivering abutments attached to said hand wheel, and abutments attached to said lower support below said upper support and adapted and arranged to receive impact from said impact delivering abutments, whereby the hand wheel may be turned to apply multiplied torque to said coupling member, and said lower support when in an extended position is retracted into said upper support by said spring as the lower support is free to retract.

References Cited in the file of this patent

UNITED STATES PATENTS

| | | |
|---|---|---|
| 2,480,899 | Bond | Sept. 6, 1949 |
| 2,613,981 | Minor | Oct. 14, 1952 |
| 2,664,175 | Hertel et al. | Dec. 29, 1953 |
| 2,672,364 | Ragland | Mar. 16, 1954 |